United States Patent [19]
Rotilio

[11] 3,739,140
[45] June 12, 1973

[54] COMBINATION WELDING TORCH

[76] Inventor: James V. Rotilio, 329 Hackensack Street, Carlstadt, N.J. 07072

[22] Filed: Sept. 20, 1971

[21] Appl. No.: 181,741

[52] U.S. Cl. .................................. 219/144, 219/75
[51] Int. Cl. ............................................. B23k 9/28
[58] Field of Search ................. 219/144, 142, 140, 219/138, 75

[56] References Cited
UNITED STATES PATENTS

| | | | |
|---|---|---|---|
| 3,539,757 | 11/1970 | Young | 219/75 |
| 2,400,285 | 5/1946 | Buck | 219/144 |
| 2,797,301 | 6/1957 | Copleston | 219/75 |
| 3,483,348 | 12/1969 | Jenkins | 219/140 X |
| 3,263,056 | 7/1966 | Tallman | 219/75 |
| 3,525,845 | 8/1970 | Sipos | 219/75 |
| 3,158,730 | 11/1964 | Hill | 219/75 |

*Primary Examiner*—E. A. Goldberg
*Assistant Examiner*—B. A. Reynolds
*Attorney*—Harry Sommers and Howard N. Sommers

[57] ABSTRACT

A combination welding torch. Adapter means are provided for electric arc welding utilizing a consumable electrode interchangeable with elements for inert gas shielded arc welding utilizing a non-consumable electrode, and connection means are provided for use in the welding torch apparatus, to thereby provide a unitary welding torch usable interchangeably for performance of welding operations.

1 Claim, 1 Drawing Figure

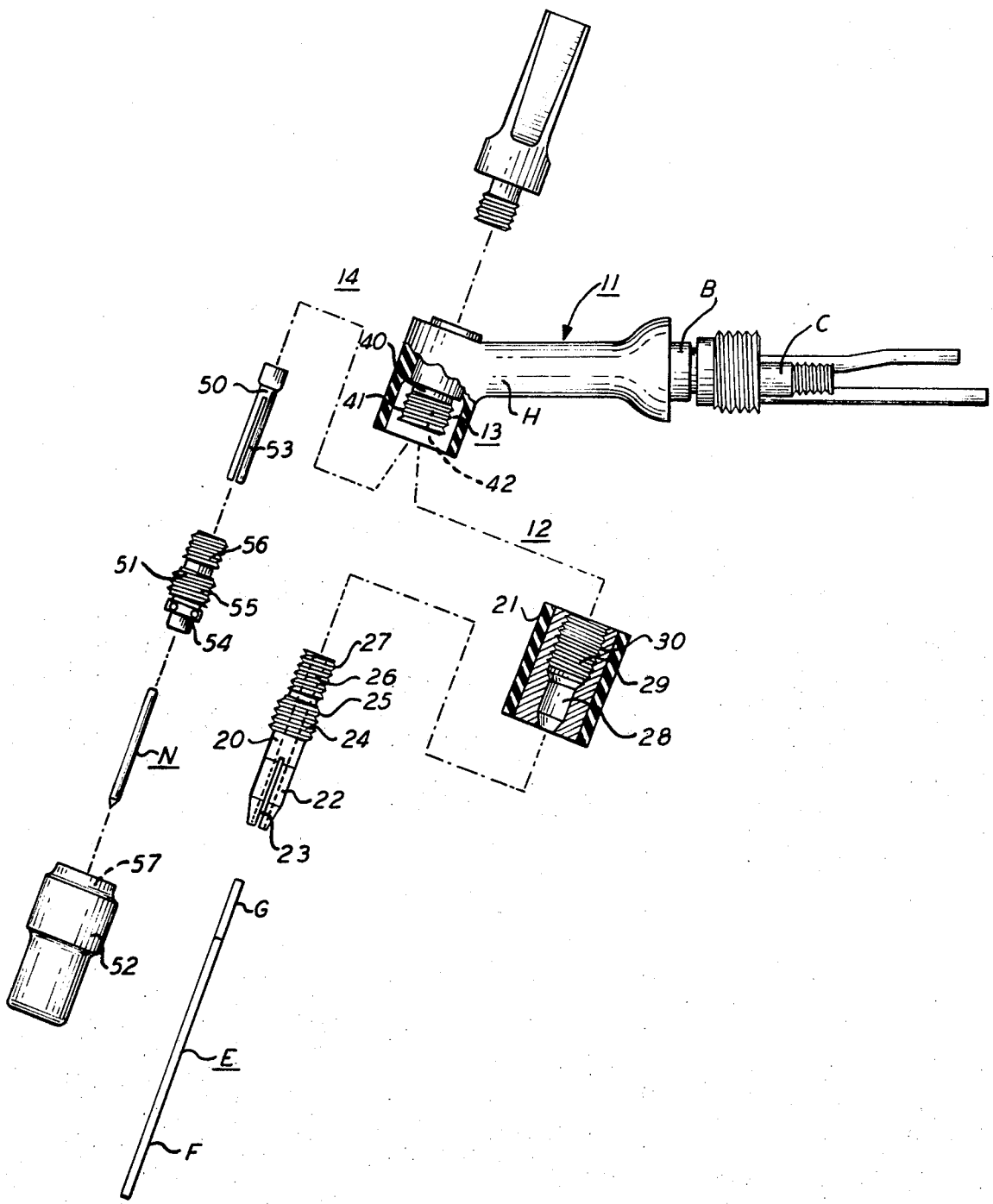
PATENTED JUN 12 1973
3,739,140
INVENTOR
JAMES V. ROTILIO
BY
Sommers & Sommers
ATTORNEYS

COMBINATION WELDING TORCH

BACKGROUND OF INVENTION

This invention relates generally to welding torches, and more specifically relates to a combination welding torch which provides a unitary apparatus for interchangeable operation and performance of electric arc welding and inert gas shielded arc welding operations.

Welding torches of the type intended to perform specific welding operations, commonly are designed in such a manner that such specific operation alone could be performed thereby. The performance of an electric arc welding operation heretofore required the use of cumbersome, weighty squeeze-grip type handles to hold the consumable electrode, and the operation performed thereby is generally effectuated at low electrical frequencies on hard alloys which would not melt during the welding operation, thereby requiring special equipment which was not utilizable in conjunction with the performance of high frequency inert-gas shielded arc welding which is generally used for soft alloy operations, with a non-consumable electrode.

The change over of operations from inert gas shielded arc welding to electric arc welding required stocking completely distinct welding torches with consequent loss of convenience, efficiency, and economy of operation resulting therefrom.

In accordance with the foregoing, it may be regarded as among the objects of the present invention to provide adapter means to enable the performance of electric arc welding operations with a unitary lightweight welding torch body construction for efficiency and convenience of operation.

It is a further object of the invention, to provide a unitary combination welding torch, which is utilizable in electric arc welding operations and inert gas shielded arc welding operations, with connection means to enable interchangeable welding operations to be performed on workpieces, and which enables efficient changeover from one operation to the other.

Now in accordance with the present invention, the foregoing objects, and others as will become apparent in the course of the ensuing specification, are achieved in a combination welding torch operable, as will be described below, so that electric arc welding and inert gas shielded arc welding operations may be performed interchangeably by the provision therein of adapter means for electric arc welding operation and of connection means, thereby increasing the utility, efficiency, and economy of use of the unitary welding torch for the combination of operations performable thereby.

BRIEF DESCRIPTION OF DRAWING

The invention is diagrammatically illustrated, by way of example, in the appended drawing, wherein similar reference characters indicate like parts, in which:

The FIGURE is a side exploded elevational view of a combination welding torch embodying the invention.

DESCRIPTION OF PREFERRED EMBODIMENTS

In accordance with the preferred mode of practicing the invention, the combination welding torch 11 (shown in the FIGURE) for example, comprises a torch body portion B and torch head portion H, connection means C therein extending therethrough and connecting said torch head portion H and torch body portion B to gas and electrical power supplies (not shown) necessary for welding operations and further comprises electric arc welding adapter means 12, connection means 13, and inert gas shielded arc welding means 14.

The electric arc welding adapter 12 means comprises, for example, hollow chuck member 20 and hollow adapter member 21. The hollow chuck member 20 is comprised of a forward portion 22 with slot 23 therein, enlarged central portion 24 with central threaded segments 25 over a substantial portion of the outer surface thereof, and rear portion 26 with rear threaded segments 27 over a substantial portion of the outer surface thereof. The hollow adapter member 21 is comprised of a forward cavity portion 28 generally corresponding in shape to the forward portion 22 of the hollow chuck member 20, and enlarged rear cavity portion 29 with rear threaded portions 30 over a substantial portion of the rear cavity walls thereof. The consumable electrode E comprises a meltable alloy member with a flux-coated portion F and a grip portion G.

The connection means 13 comprises, for example a hollow collar member 40 with outer threaded portions 41 over a substantial portion of the outer surface thereof, and with inner threaded portion 42 over a substantial portions of the inner cavity surface thereof.

The inert-gas shielded arc welding means 14 comprises for example, hollow electrode retainer 50, hollow collar member 51, and hollow cover member 52. The hollow electrode retainer 50 has a front-opening slot 53 therein; the hollow cover member 51 has a forward grip portion 54, a central enlarged threaded portion 55, and a rear threaded portion 56; the hollow cover member 52 has a rear inner threaded portion 57 (not shown) therein. The nonconsumable electrode N is retained in the elements above-described.

In operation, for example, the combination welding torch 11 may be utilized for electric arc welding operation by positioning the hollow chuck member 20, with the consumable electrode E gripped therein at grip portion G thereof in slot 23, in the connection means 13 by threading the rear portion 26 of the hollow chuck member 20 into the inner threaded portion 42 of the hollow collar member 40, and placing the hollow adapter member 21 over the hollow chuck member 20 and threading the enlarged rear cavity portion 28 of hollow adapter member 21 onto the outer threaded portion 41 of the hollow collar member 40, thereby affixing the electric arc welding adapter means 12 to the connection means 13 and securely gripping the grip portion G of the consumable electrode E therein by the clamping thereagainst of the forward portion 22 of hollow chuck member 20 due to the pressure of the forward cavity portion 28 of hollow adapter member 21. Electric arc welding is then initiated by striking or scratching the tip of the consumable electrode E to generate an arc and forming a weld puddle as the electrode melts.

To changeover to an inert gas shielded arc welding operation, the electric arc welding elements are removed by reversal of the above-described procedure, and the hollow collar member 51 is placed over the hollow electrode retainer 50 with the nonconsumable electrode N gripped therein, and the elements are then connected to the connection means 13 by threading the rear threaded portion 56 of the hollow collar member 50 in the inner threaded portion 42 of hollow collar member 40; the hollow cover member 52 is then connected by threading the rear inner threaded portion 57 thereof on outer threaded portion 41 of hollow collar member 40.

It is thus seen that the sequence of operations described above enables the interchangeable use of a unitary welding torch construction for electric arc welding operations and inert gas shielded arc welding operations, to thereby enable use thereof for diverse welding operations utilizing high or low frequency and operable on hard or soft alloys as appropriate, to meet the requirements of the operations with optimum efficiency and convenience.

While the present invention has been particularly described in terms of a specific embodiment thereof, it will be understood in view of the present disclosure, that numerous modifications upon the invention are now enabled to those skilled in the art, which variations in propriety yet reside within the true scope of the instant teaching. Accordingly, the invention is to be broadly construed, and limited only by the scope and spirit of the claims now appended hereto.

I claim:

1. A combination welding torch apparatus, which is utilizable interchangeably for the performance of a gas shielding arc welding operation utilizing a non-consumable electrode, or an electric arc welding operation utilizing a consumable electrode, and which is connectable to a gas supply and an electric power supply, and which includes a torch body member including a head portion and an insulating cover which encases the head portion, wherein the improvement comprises:

a. means for interconnecting an adapter to the torch body member head portion, comprising a hollow collar member which is connected to the torch head portion, and which includes an outer surface portion, an inner surface portion, outer threaded segments over a substantial portion of the outer surface portion, and inner threaded segments over a substantial portion of the inner surface portion; and b. means for adaptably retaining a consumable electrode in the torch body member head portion, comprising:

1. a hollow chuck member, for retaining the consumable electrode therein, which includes a forward portion having a front-opening slot therein, an enlarged central portion, central threaded segments over a substantial portion of the enlarged central portion, a rear portion, and rear threaded segments over a substantial portion of the rear portion; and 2. a hollow adapter member, for retaining therein the hollow chuck member and the consumable electrode, and for connecting the hollow chuck member and the consumable electrode to the interconnection means, which includes a forward cavity portion which is generally complementary in shape to the forward portion of the hollow chuck member, an enlarged rear cavity portion, and rear threaded portions over a substantial portion of the enlarged rear cavity portion.

* * * * *